(12) United States Patent
Hayashida et al.

(10) Patent No.: US 8,877,879 B2
(45) Date of Patent: Nov. 4, 2014

(54) APPARATUS FOR PRODUCING METHACRYLIC POLYMER AND PRODUCTION METHOD THEREOF

(75) Inventors: Masahiro Hayashida, Hiroshima (JP);
Hisaaki Yoshimura, Hiroshima (JP);
Daisuke Nonaka, Hiroshima (JP);
Yusuke Morita, Hiroshima (JP);
Mitsuhiro Matsuo, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 239 days.

(21) Appl. No.: 13/639,668

(22) PCT Filed: Apr. 4, 2011

(86) PCT No.: PCT/JP2011/058543
§ 371 (c)(1),
(2), (4) Date: Oct. 5, 2012

(87) PCT Pub. No.: WO2011/125980
PCT Pub. Date: Oct. 13, 2011

(65) Prior Publication Data
US 2013/0041117 A1 Feb. 14, 2013

(30) Foreign Application Priority Data
Apr. 6, 2010 (JP) ................................. 2010-087515

(51) Int. Cl.
*C08F 2/01* (2006.01)
*C08F 20/02* (2006.01)
*B01J 19/24* (2006.01)
*B01J 19/00* (2006.01)
*C08F 2/00* (2006.01)
*B01J 19/18* (2006.01)
*C08F 220/18* (2006.01)

(52) U.S. Cl.
CPC .......... *C08F 2/01* (2013.01); *B01J 2219/00094* (2013.01); *B01J 19/242* (2013.01); *B01J 2219/0004* (2013.01); *B01J 19/0066* (2013.01); *C08F 220/18* (2013.01); *C08F 2/001* (2013.01); *B01J 19/1806* (2013.01)
USPC .............................. 526/64; 526/319; 422/134

(58) Field of Classification Search
CPC ............ C08F 2/01; C08F 20/02; C08F 20/06; C08F 20/10
USPC .................... 526/64, 319; 422/134
See application file for complete search history.

(56) References Cited

U.S. PATENT DOCUMENTS

2010/0087605 A1   4/2010   Yamamoto et al.

FOREIGN PATENT DOCUMENTS

| JP | 8-253507 A | 10/1996 |
| JP | 2001-59003 A | 3/2001 |
| JP | 2004-211106 A | 7/2004 |
| JP | 2008-101203 A | 5/2008 |
| JP | 2011-038022 A | 2/2011 |

OTHER PUBLICATIONS

International Search Report issued Apr. 26, 2011 in PCT/JP2011/058543 with English Translation.

*Primary Examiner* — Vu A Nguyen
(74) *Attorney, Agent, or Firm* — Oblon, Spivak, McClelland, Maier & Neustadt, L.L.P.

(57) ABSTRACT

Disclosed is an apparatus for producing a high-quality methacrylic polymer with good productivity, comprising a complete mixing type reactor 11, tubular reactors 12 and 13 which have been serially connected, and a volatile removing instrument 14, wherein at least two of the tubular reactors 12 and 13 are connected via a cooler 15 for cooling the reaction mixture. It is preferable that the cooler 15 is a multitubular cooler and the tubular reactors 12 and 13 are plug flow reactors.

20 Claims, 1 Drawing Sheet

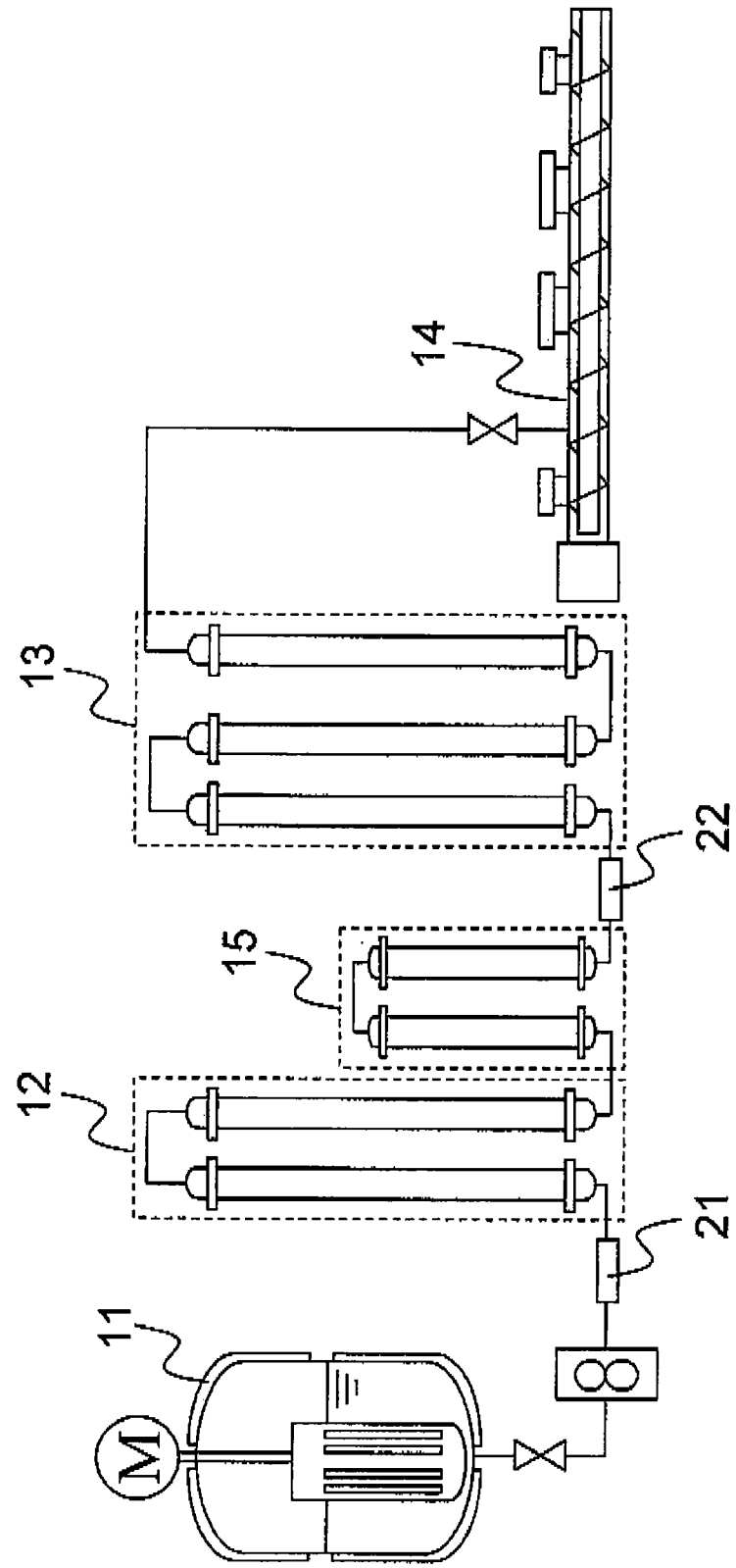

APPARATUS FOR PRODUCING METHACRYLIC POLYMER AND PRODUCTION METHOD THEREOF

TECHNICAL FIELD

The present invention relates to an apparatus for producing a methacrylic polymer and a production method using the apparatus.

BACKGROUND ART

Methods of producing a methacrylic polymer by bulk polymerization have a merit of excellent productivity as compared with batch mode suspension polymerization, a merit of very excellent transparency of the resulting polymer since auxiliary agents such as a dispersing agent and the like are not required, a merit of no necessity of separation of a reaction solvent in comparison to solution polymerization, a merit of very excellent transparency of the resulting polymer since a residual solvent is not present in the polymer after removal of volatiles, and further a merit of obtaining a polymer excellent in thermal degradation resistance since the amount of a polymerization initiator to be fed to a reaction region is permitted to be very small.

As a method of continuously performing such bulk polymerization of a methacrylic polymer, production methods excellent in productivity using a complete mixing type reactor, a tubular reactor and a volatile removing instrument are investigated.

For example, patent document 1 describes a method wherein in polymerizing using a complete mixing type reactor and a successively placed tubular reactor, a polymerization initiator is further added to a reaction solution extracted from the complete mixing type reactor and the polymerization reaction is carried out in the tubular reactor, to improve polymerization ratio.

PRIOR TECHNICAL DOCUMENT

Patent Document

Patent document 1: JP-A No. 2003-2912

SUMMARY OF THE INVENTION

Problem to be Solved by the Invention

It is envisaged to raise polymerization ratio for further improving productivity, in the method described in patent document 1.

In the polymerization reaction of a methacrylic monomer, an equilibrium reaction is dominant, and if polymerization is conducted at high temperature, depolymerization of a polymer occurs and it becomes difficult to raise polymerization ratio.

For this reason, it is preferable for raising polymerization ratio to carry out the reaction at lowered polymerization temperature, and it is envisaged to raise polymerization ratio by lowering polymerization temperature in polymerization in the tubular reactor of the reaction solution extracted from the complete mixing type reactor, for raising polymerization ratio in the method described in patent document 1.

However, if a polymerization initiator is further added to the reaction solution of higher temperature extracted from the complete mixing type reactor, then, the reaction solution is fed to the tubular reactor and the polymerization temperature in the tubular reactor is lowered, then, the viscosity of the reaction solution around the inner wall of the tubular reactor increases, a residence part is generated, and the temperature of the residence part lowers, thus, the half-life period of the initiator elongates.

That is, a polymerization-progressed resin having higher molecular weight is generated around the inner wall of the tubular reactor. As a result, the flow channel of the tubular reactor is gradually narrowed, the tube is clogged, and stable operation becomes difficult.

Means for Solving the Problem

The subject of the present invention is an apparatus for producing a methacrylic polymer which comprises: a complete mixing type reactor, tubular reactors which have been serially connected, and a volatile removing instrument, wherein at least two of said tubular reactors are connected via a cooler for cooling the reaction solution.

Further, the subject of the present invention is a method c polymer using the above-described apparatus, comprising a step of polymerizing a methacrylic monomer mixture in the complete mixing type reactor at a polymerization temperature of 110 to 170° C. up to a polymerization ratio of 35 to 55%, a step of further adding a polymerization initiator to the reaction solution obtained in the previous step, then, polymerizing the reaction solution in a first tubular reactor at an outlet temperature of 140 to 180° C. and a polymerization ratio of 55 to 70%, a step of cooling the reaction solution obtained in the previous step by a cooler down to a temperature of 85 to 140° C., a step of further adding a polymerization initiator to the cooled reaction solution, and polymerizing the reaction solution in a second tubular reactor at an outlet temperature of 150 to 180° C. and a polymerization ratio of 70 to 85%, and a step of removing volatiles from the reaction solution obtained in the previous step by a volatile removing instrument.

Effect of the Invention

According to the apparatus of the present invention, the polymerization ratio of the reaction solution before removal of a solvent by the volatile removing instrument can be raised, thus, heat quantity, time and the like necessary for the volatile removing instrument can be reduced and productivity of a methacrylic polymer is improved.

Further, since the time of exposure of the reaction solution to higher temperature is reduced, generation of a dimer in a methacrylic polymer can be suppressed and quality thereof is improved.

BRIEF EXPLANATION OF DRAWINGS

FIG. 1 is a schematic view of a production apparatus.

MODES FOR CARRYING OUT THE INVENTION

The apparatus for producing a methacrylic polymer of the present invention will be illustrated referring to FIG. 1. The apparatus for producing a methacrylic polymer of the present invention is constituted of a complete mixing type reactor 11, multiple tubular reactors 12 and 13 connected via a cooler 15 cooling the reaction solution, and a volatile removing instrument 14.

The reaction solution obtained by polymerization of a methacylic monomer mixture in the complete mixing type reactor 11 is polymerized in the tubular reactor 12, then, cooled in the cooler 15, and again subjected to a polymerization reaction in the tubular reactor 13. The resultant reaction solution is deprived of a solvent in the volatile removing instrument 14, to obtain a methacrylic polymer.

Polymerization initiator input instruments 21 and 22 equipped with a static mixer are preferably disposed at the reaction solution inlet sides of the tubular reactors 12 and 13. By this constitution, it becomes easy to uniformly mix a polymerization initiator into the reaction solution.

It is preferable that, between the complete mixing type reactor 11 and the tubular reactor 12, a pump for feeding the reaction solution to the tubular reactor 12 is disposed. By continuously extracting the reaction solution using the pump, the reaction solution can be fed stably to the next step. As the pump, a commercially available gear pump can be used.

(Complete Mixing Type Reactor)

As the complete mixing type reactor 11, a tank reactor equipped with a supply port, an output port and a stirring instrument can be used, and it is preferable that the stirring instrument has a mixing performance over the whole reaction region.

The temperature control in the reactor can be carried out by known methods. For example, methods of heating or heat transmission and heat removal by heat medium circulation through a jacket outside of the reactor, a draft tube or a coil disposed in the reactor, and the like can be adopted.

(Tubular Reactor)

The tubular reactors 12 and 13 are preferably plug flow reactors, more preferably jacketed tubular reactors having a static mixer installed inside. When a static mixer is installed inside, the reaction can be uniformalized and the reaction solution flow can be stabilized by a stirring effect thereof. The tubular reactors 12 and 13 can be used as a group composed of multiple tubular reactors. Hence, the tubular reactors 12 and 13 described here may be composed of a single reactor or multiple reactors.

As the static mixer, Static Mixer manufactured by Noritake Co., Ltd. and Throughzer Mixer manufactured by Sumitomo Heavy Industries, Ltd. are suitable. When the static mixer is installed, a static mixer showing small pressure loss is preferably used.

Regarding the reactor, multiple reactors are serially connected and used.

(Cooler Cooling Reaction Solution)

The cooler 15 for cooling the reaction solution includes a multitubular cooler, a double tube heat exchanger, a coiled cooler, a plate cooler and the like, and if cooling efficiency is taken into consideration, a multitubular cooler is preferably used. Further, multiple coolers may be serially connected and used.

In the present invention, it is necessary that at least two of serially connected multiple tubular reactors are connected via a cooler. When two tubular reactors are present, the tubular reactors 12 and 13 are connected vie the cooler 15. The same effect is obtained also when the above-described complete mixing type reactor 11 and one of ends of serially connected multiple tubular reactors are connected via the cooler 15.

In the present invention, there is no need to lower the temperature of the reaction solution in the tubular reactor 13 since the polymerization reaction is carried out in the tubular reactor 12, then, the temperature of the reaction solution is lowered in the cooler 15 and the reaction solution of lower temperature is fed to the tubular reactor 13, thus, polymerization becomes possible without occurrence of residence in the tubular reactor 13 and Without clogging of the reactor, and polymerization ratio before performing devolatilization by a volatile removing instrument can be improved.

(Volatile Removing Instrument)

As the volatile removing instrument 14, a screw devolatilizing extruder can be used. The screw devolatilizing extruder generally has a cylinder equipped with a reaction solution supply port, a polymer outlet and a volatile Vent, and a screw disposed in this cylinder.

In the screw devolatilizing instrument, volatiles are evaporated by heat generation by kneading and heating from the cylinder.

In the screw devolatilizing instrument, it is preferable that a rear volatile vent, a reaction solution supply port, a fore volatile vent and a polymer outlet are arranged from the screw driving part side toward the front edge side. The reaction solution supplied from the reaction solution supply port discharges heat quantity stored as latent heat at the reaction solution supply port, thereby flush-evaporating volatiles. For quick removal of a vapor of the volatiles from the extruder, it is preferable to provide a rear volatile vent at the opposite side of the resin flow direction with respect to the reaction solution supply port.

Further, for suppression of generation of a carbide and coloration of a resin, it is preferable that the cylinder inner wall and the screw surface and the like are coated with a metal other than iron, such as chromium, titanium and the like. The coating method is not particularly restricted, and chromium plating and the like are general, and for increasing close adhesiveness of a coating film, CVD (chemical vapor deposition) and PVD (physical vapor deposition) are preferable.

One example of the method for producing a methacrylic polymer using the apparatus of the present invention will be illustrated.

(Step of Polymerizing Methacrylic Monomer Mixture by Complete Mixing Type Reactor at Polymerization Temperature of 110 to 170° C. Up to Polymerization Ratio of 35 to 70%)

The apparatus of the present invention is suitably applied to production of a homopolymer of methyl methacrylate, or a copolymer containing 80 wt % or more of a methyl methacrylate unit and 20 wt % or less of an alkyl(meth)acrylate (excluding methyl methacrylate) unit.

These are obtained by homopolymerization of methyl methacrylate, or copolymerization of a monomer mixture containing methyl methacrylate and an alkyl(meth)acrylate (excluding methyl methacrylate), respectively. Here, the alkyl(meth)acrylate means an alkyl acrylate or an alkyl methacrylate.

The alkyl acrylate is preferably that having an alkyl group having 1 to 18 carbon atoms, and examples thereof include alkyl acrylates having an alkyl group such as methyl, ethyl, n-propyl, n-butyl, 2-ethylhexyl, dodecyl, stearyl and the like.

The alkyl methacrylate is preferably that having an alkyl group having 2 to 18 carbon atoms, and examples thereof include alkyl methacrylates having an alkyl group such as ethyl, n-propyl, n-butyl, 2-ethylhexyl, dodecyl, stearyl and the like.

Two or more alkyl(meth)acrylates (excluding methyl methacrylate) may be used together. Further, at least one alkyl acrylate and at least one alkyl methacrylate excluding methyl methacrylate may be used together, In the present invention, these methacrylic monomers are polymerized using a polymerization initiator by the complete mixing type reactor 11.

The polymerization initiator includes organic peroxides such as tert-butyl peroxy-3,5,5-trimethyl hexanate, tert-butyl peroxylaurate, tert-butyl peroxyisopropyl monocarbonate, tert-hexyl peroxyisopropyl monocarbonate, tert-butyl peroxyacetate, 1,1-bis(tert-butylperoxy)3,3,5-trimethylcyclohexane, 1,1-bis(tert-butylperoxy)cyclohexane, tert-butyl peroxy-2-ethyl hexanate, tert-butyl peroxyisobutyrate, tert-hexyl-hexylperoxy-2-ethyl hexanate, di-tert-butyl peroxide, 2,5-dimethyl-2,5-bis(tert-butylperoxy)hexane and the like; azo compounds such as 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azobisisobutyrate, 2,2'-azobis(2,4,4-trimethylpentane), 2,2'-azobis(2-methylpropane) and the like; persulfates such as potassium persulfate and the like; redox polymerization initiators; and the like. These may be used in combination.

For regulation of molecular weight, a chain transfer agent may be used. As the chain transfer agent, mercaptan compounds are preferably used. The mercaptan compound includes primary, secondary or tertiary mercaptans having an alkyl group or a substituted alkyl group such as n-butyl, isobutyl, n-octyl, n-dodecyl, sec-butyl, sec-dodecyl and tert-butyl mercaptans, and the like; aromatic mercaptans such as phenyl mercaptan, thiocresol, 4-tert-butyl-O-thiocresol and the like; thioglycolic acid and esters thereof; mercaptans having 3 to 18 carbon atoms such as ethylene thioglycol and the like. Two or more chain transfer agents may be used in combination.

The ratio (polymerization ratio) of a polymer occupying the reaction solution as a mixture of the polymer and unreacted monomers and the like in the complete mixing type reactor 11 is preferably 35 to 55%, more preferably to 55%. When the polymerization ratio is 35% or more, the polymerization ratio of the reaction solution before removal of a solvent by the volatile removing instrument can be 70% or more, and heat quantity, time and the like necessary for the volatile removing instrument can be reduced. When the polymerization ratio is 55% or less, mixing and heat transmission are attained sufficiently and stable polymerization is made possible.

The polymerization temperature in the complete mixing type reactor 11 is preferably 110 to 170° C. Within this range, the polymerization ratio can be stably 35% or more. The average residence time in the complete mixing type reactor 11 is preferably 1 to 6 hours.

(Step of Further Adding Polymerization Initiator to Reaction Solution Obtained in Previous Step, then, polymerizing Reaction Solution in the First Tubular Reactor at Outlet Temperature of 140 to 180° C.)

To the reaction solution obtained by performing polymerization in the complete mixing type reactor 11, a polymerization initiator is further added, then, the solution is fed to the first tubular reactor 12 and polymerization is carried out in the tubular reactor 12.

As the polymerization initiator, the same initiators as used in the complete mixing type reactor can be used.

For further adding a polymerization initiator to the reaction solution, it is preferable to perform uniform mixing thereof in the polymerization initiator input instrument 21 equipped with a static mixer.

In the tubular reactor 12, the polymerization ratio is preferably 55 to 70%, more preferably 60 to 70%. When the polymerization ratio is 55 to 70%, the polymerization ratio of the reaction solution before removal of a solvent in the volatile removing instrument can be 70 to 85%.

The inlet temperature of the tubular reactor 12 is preferably 120 to 140° C. and the outlet temperature thereof is preferably 140 to 180° C.

(Step of Cooling Reaction Solution Obtained in Previous Step Down to 85 to 140° C.)

The reaction solution obtained by performing polymerization in the tubular reactor 12 is fed to the cooler 15.

It is preferable in the cooler 15 that the temperature of the reaction solution obtained by performing polymerization in the tubular reactor 12 is cooled down to 85 to 140° C. By adjusting the temperature to 85° C. or higher, flowability of the reaction solution can be ensured and the reaction solution can be transferred smoothly in a pipe arrangement. By adjusting the temperature of the reaction solution to 140° C. or lower, the reaction temperature in the tubular reactor 13 can be lowered and improvement in polymerization ratio can be attained.

Since the reaction solution obtained by performing polymerization in the tubular reactor 12 contains no initiator, a pipe arrangement in the cooler 15 is not clogged. Here, if the concentration of an initiator in the reaction solution obtained in the tubular reactor 12 is in the range of 0.01 ppm to 5 ppm, a problem of clogging of a pipe arrangement does not occur. When the concentration of a polymerization initiator in a reaction product entering into the cooler is too high, the viscosity of the reaction solution around the inner wall of a cooling tube increases, a residence part is generated and clogging of the cooler occurs in some cases like the above-described phenomenon.

(Step of Further Adding Polymerization Initiator to Reaction Solution after Cooling and Polymerizing Reaction Solution in Second Tubular Reactor at Outlet Temperature of 150 to 180° C.)

To the reaction solution cooled in the instrument 15, a polymerization initiator is added again, then, the polymerization reaction thereof is carried out in the second tubular reactor 13.

As the polymerization initiator, the same initiator as used in the tubular reactor 12 can be used, and since the reaction is carried out at higher temperature than in the tubular reactor 12, the polymerization initiator used in the tubular reactor 13 is preferably a polymerization initiator of high temperature decomposition type showing longer half-life period than the polymerization initiator in the tubular reactor 12. In the tubular reactor 13, the polymerization ratio is preferably 70 to 85%, more preferably 75 to 85%. When the polymerization ratio is improved furthermore, the energy for removing a solvent in the volatile removing instrument can be reduced moreover.

For further adding a polymerization initiator to the reaction solution, it is preferable to perform uniform mixing thereof in the polymerization initiator input instrument 22 having a static mixer. The outlet temperature of the tubular reactor 13 is preferably 150 to 180° C.

(Step of Removing Volatile by Volatile Removing Instrument from Reaction Solution Obtained in Previous Step)

The reaction solution obtained in the tubular reactor 13 is fed to the volatile removing instrument 14, and volatiles are removed here, to obtain a methacrylic polymer.

The volatile removing instrument 14 is preferably a screw devolatilizing instrument in which a rear volatile vent, a reaction solution supply port, a fore volatile vent and a polymer outlet are arranged from the screw driving part side toward the front edge side. The reaction solution supplied from the reaction solution supply port discharges heat quantity stored as latent heat at the reaction solution supply port, thereby flush-evaporating volatiles.

The temperature of the reaction solution fed to a screw devolatilizing instrument is preferably 180° C. to 250° C. Within this range, coloration of a methacrylic polymer can be prevented.

It is preferable from the standpoint of economy that volatiles such as unreacted monomers and the like are recovered by condensing by a condenser, and re-used. In this case, it is more preferable that higher boiling point components such as a dimer of a vinyl monomer and the like contained in volatiles are separated and removed by distillation, thereafter, re-used as monomers.

The methacrylic polymer produced by the apparatus of the present invention can be used, for example, as a molding material. In using as a molding material, lubricants such as higher alcohols, higher fatty esters and the like may be added. If necessary, ultraviolet absorbers, thermal stabilizers, coloring agents, antistatic agents, antioxidants, facial washes and the like may be added.

EXAMPLES

The present invention will be explained with examples mentioned below. Evaluations of physical properties of polymers in examples were carried out by the following methods.
(Residual Dimer Amount)

The residual dimer amount (wt %) in a polymer is measured by gas chromatography. As gas chromatography, GC-17A manufactured by Shimadzu Corp. was used. As a solvent, acetone was used. Butyl acetate was used as an internal standard. A calibration curve is made previously, and the residual dimer amount in liquid was calculated from the results of gas chromatography of the polymer-dissolved solution.
(Weight-Average Molecular Weight)

The weight-average molecular weight was measured by a gel permeation chromatography method (GPC). For measurement by a GPC method, a methacrylic resin was dissolved in tetrahydrofuran (THF), then, liquid chromatography "HLC-8020" (trade name, manufactured by Tosoh Corp.) was used, and as the separation column, two columns of "TSK-Gel GMHXL" (trade name, manufactured by Tosoh Corp.) were serially connected, as the solvent, THF was used, the flow rate was adjusted to 1.0 ml/min, as the detector, a differential refractometer was used, the measurement temperature was adjusted to 40° C., the injection amount was adjusted to 0.1 ml, and polymethyl methacrylate was used as the standard polymer.
[Production of Methacrylic Polymer]

A methacrylic polymer was produced using an apparatus having a schematic constitution shown in FIG. 1. In the apparatus shown in FIG. 1, a complete mixing type reactor 11, a tubular reactor 12, a cooler 15 as a multitubular cooler, a tubular reactor 13 and a devolatilizing extruder 14 are arranged in this order, and these are connected via pipe arrangements.

Further, the initiator input instrument 21 is connected between the complete mixing type reactor 11 and the tubular reactor 12, and the initiator input instrument 22 is connected between the cooler 15 and the tubular reactor 13.

Example 1

Nitrogen was introduced into a monomer mixture composed of 98 wt % of purified methyl methacrylate and 2 wt % of methyl acrylate to adjust the dissolved oxygen to 0.5 ppm, then, to this monomer mixture were mixed $0.26 \times 10^{-4}$ mol of 1,1-bis(t-butylperoxy)-3,5,5-trimethylcyclohexane per 100 g of the monomer as the polymerization initiator and 0.150 mol of n-octyl mercaptan per 100 g of the monomer (0.22 wt %) as the chain transfer agent, and the mixture was continuously fed to the complete mixing type reactor 11 controlled at a polymerization temperature of 135° C. and polymerized while stirring to mix. The average residence time was 2.5 hours.

Subsequently, the reaction solution was extracted continuously from the reactor, and further 1,1-bis(t-butylperoxy)-3,5,5-trimethylcyclohexane was added in an amount of 20 ppm with respect to the raw material flow rate per unit time in a pipe arrangement part 21 having SMX Throughzer Mixer manufactured by Sumitomo Heavy Industries, Ltd. installed inside, and the mixture was fed to the tubular reactor 12 (plug flow reactor) having Static Mixer manufactured by Noritake Co., Ltd. installed inside.

The tubular reactor had a jacket temperature adjusted to 150° C. The average residence time was 20 minutes.

Next, the reaction product was fed to the cooler, and the temperature of the reaction product was lowered from 162° C. to 130° C. At this moment, the cooler had a jacket temperature adjusted to 110° C.

Subsequently, to the cooled reaction product was further added di-t-butyl peroxide in an amount of 70 ppm with respect to the raw material flow rate per unit time in a pipe arrangement part 22 having SMX Throughzer Mixer manufactured by Sumitomo Heavy Industries, Ltd. installed inside, and the mixture was fed to the tubular reactor 13 (plug flow reactor) having Static Mixer manufactured by Noritake Co., Ltd. installed inside. The tubular reactor had a jacket temperature adjusted to 1700° C., and the reaction solution outlet temperature was 172° C. The resultant reaction solution had a polymerization ratio of 77%.

Further, the reaction solution was continuously fed to a screw devolatilizing instrument 14 at 230° C., and volatiles composed unreacted monomers as main components were separated and removed at 270° C., to obtain a polymer.

The polymerization conditions, the polymerization ratio, the residual dimer amount of the resultant polymer, and the like at each step are shown in Table 1. The tubular reactor was not clogged, stable polymerization was possible and the residual dimer amount was 280 ppm.

Example 2

Nitrogen was introduced into a monomer mixture composed of 98 wt % of purified methyl methacrylate and 2 wt % of methyl acrylate to adjust the dissolved oxygen to 0.5 ppm, then, to this monomer mixture were mixed $0.32 \times 10^{-4}$ mol of 1,1-bis(t-butylperoxy)-3,5,5-trimethylcyclohexane per 100 g of the monomer as the polymerization initiator and 0.150 mol of n-octyl mercaptan per 100 g of the monomer (0.22 wt %) as the chain transfer agent, and the mixture was continuously fed to the complete mixing type reactor 11 controlled at a polymerization temperature of 135° C. and polymerized while stirring to mix. The average residence time was 2.0 hours.

Subsequently, the reaction solution was extracted continuously from the reactor, and further a polymerization initiator composed of 1,1-bis(t-butylperoxy)-3,5,5-trimethylcyclohexane and di-t-butyl peroxide mixed at a ratio of 75 wt %:25 wt % was added in an amount of 20 ppm with respect to the raw material flow rate per unit time in a pipe arrangement part 21 having SMX Throughzer Mixer manufactured by Sumitomo Heavy Industries, Ltd. installed inside, and the mixture was fed to the tubular reactor 12 (plug flow reactor) having Static Mixer manufactured by Noritake Co., Ltd. installed inside.

The tubular reactor had a jacket temperature adjusted to 175° C. The average residence time was 20 minutes.

Next, the reaction product was fed to the cooler, and the temperature of the reaction product was lowered from 165° C. to 130° C. At this moment, the cooler had a jacket temperature adjusted to 110° C.

Subsequently, to the cooled reaction product was further added di-t-butyl peroxide in an amount of 20 ppm with respect to the raw material flow rate per unit time in a pipe arrangement part 22 having SMX Throughzer Mixer manufactured by Sumitomo Heavy Industries, Ltd. installed inside, and the mixture was fed to the tubular reactor 13 (plug flow reactor) having Static Mixer manufactured by Noritake Co., Ltd. installed inside. The tubular reactor had a jacket temperature adjusted to 170° C., and the reaction solution outlet temperature was 178° C. The resultant reaction solution had a polymerization ratio of 81%.

Further, the reaction solution was continuously fed to a screw devolatilizing instrument 14 at 230° C., and volatiles composed unreacted monomers as main components were separated and removed at 270° C., to obtain a polymer.

The polymerization conditions, the polymerization ratio, the residual dimer amount of the resultant polymer, and the like at each step are shown in Table 1. The tubular reactor was not clogged, stable polymerization was possible and the residual dimer amount was 300 ppm.

Comparative Example 1

A methacrylic polymer having the same composition as in Example 1 was produced under conditions shown in Table 1 without using the cooler 15.

The polymerization conditions, the polymerization ratio, the residual dimer amount of the resultant polymer, and the like at each step are shown in Table 1. The outlet reaction solution temperature of the tubular reactor 13 was as high as 183° C. and the polymerization ratio was not raised, and the polymerization ratio of the resultant reaction solution was 68% and the residual dimer amount was as high as 600 ppm.

Comparative Example 2

A methacrylic polymer having the same composition as in Example 1 was produced at lowered temperatures of the tubular reactors 12 and 13 under conditions shown in Table 1 without using the cooler 15. The polymerization conditions, the polymerization ratio and the like at each step are shown in Table 1.

Since the temperature of the reaction solution in the tubular reactor was lowered, the tubular reactor was clogged and a polymer could not be obtained.

TABLE 1

| | Perfectly Stirred Reactor 11 Polymerization Conditions | | | | | Tubular Reactor 12 Polymerization Conditions | |
|---|---|---|---|---|---|---|---|
| | Polymerization Initiator ($\times 10^4$) [mol/100 g] | Chain Transfer Agent [wt %] | Polymerization Temperature [° C.] | Average Residence Time [hr] | Polymerization Ratio [%] | Polymerization Initiator [ppm] | Polymerization Initiator ($\times 10^4$) [mol/100 g] |
| Ex. 1 | 0.260 | 0.22 | 135 | 2.5 | 50 | 20 | 0.066 |
| Ex. 2 | 0.320 | 0.22 | 135 | 2.0 | 50 | 15/5 | 0.050/0.035 |
| Comp. Ex. 1 | 0.250 | 0.22 | 135 | 2.5 | 49 | 20 | 0.660 |
| Comp. Ex. 2 | 0.100 | 0.23 | 135 | 3.0 | 47 | 20 | 0.066 |

| | Tubular Reactor 12 Polymerization Conditions | | | | Cooler 15 | | |
|---|---|---|---|---|---|---|---|
| | | | | | Inlet | | |
| | Jacket Temperature [° C.] | Outlet Reaction Solution Temperature [° C.] | Residence Time [min] | Polymerization Ratio [%] | Jacket Temperature [° C.] | Reaction Solution Temperature [° C.] | Outlet Reaction Solution Temperature [° C.] |
| Ex. 1 | 150 | 162 | 20 | 63 | 110 | 162 | 130 |
| Ex. 2 | 175 | 165 | 20 | 65 | 110 | 165 | 130 |
| Comp. Ex. 1 | 150 | 162 | 20 | 62 | — | — | — |
| Comp. Ex. 2 | 150 | 157 | 20 | 58 | — | — | — |

| | Tubular Reactor 13 Polymerization Conditions | | | | | | Polymer Physical Properties | |
|---|---|---|---|---|---|---|---|---|
| | | | | Outlet | | | Residual | Weight-average |
| | Polymerization Initiator [ppm] | Polymerization Initiator ($\times 10^4$) [mol/100 g] | Jacket Temperature [° C.] | Reaction Solution Temperature [° C.] | Residence Time [hr] | Polymerization Ratio [%] | Dimer Amount [ppm] | Molecular Weight Mw [—] |
| Ex. 1 | 70 | 0.490 | 170 | 172 | 20 | 77 | 280 | 88,000 |
| Ex. 2 | 20 | 0.140 | 170 | 178 | 20 | 81 | 300 | 89,000 |
| Comp. Ex. 1 | 15 | 0.105 | 170 | 183 | 20 | 69 | 600 | 89,000 |
| Comp. Ex. 2 | 20 | 0.140 | 150 | — | 20 | Clogging | — | — |

EXPLANATION OF REFERENCES

11: complete mixing type reactor
12: tubular reactor
13: tubular reactor
14: volatile removing instrument
15: cooler
21: initiator input instrument
22: initiator input instrument

The invention claimed is:

1. An apparatus for producing a methacrylic polymer, the apparatus comprising:
a complete mixing type reactor,
a cooler for cooling a reaction solution,
tubular reactors which have been serially connected, and
a volatile removing instrument,
wherein the cooler is equipped between at least two of the tubular reactors.

2. The apparatus according to claim 1, wherein the cooler is a multitubular cooler.

3. The apparatus according to claim 1, wherein the tubular reactors are plug flow reactors.

4. A method for producing a methacrylic polymer with the apparatus according to claim 1, the method comprising
polymerizing a methacrylic monomer mixture in the complete mixing type reactor at a polymerization temperature of from 110 to 170° C. and up to a polymerization ratio of from 35 to 55%, to obtain a reaction solution,
adding a polymerization initiator to the reaction solution and polymerizing the reaction solution in a first tubular reactor, wherein, at an outlet, a temperature is from 140 to 180° C. and a polymerization ratio is from 55 to 70%,
cooling the reaction solution with the cooler down to a temperature of from 85 to 140° C., to obtain a cooled reaction solution,
adding a polymerization initiator to the cooled reaction solution, and polymerizing the cooled reaction solution in a second tubular reactor, wherein at an outlet, the temperature is from 150 to 180° C. and a polymerization ratio is from 70 to 85%, and
removing volatiles from the reaction solution with the volatile removing instrument.

5. The apparatus according to claim 2, wherein the tubular reactors are plug flow reactors.

6. The apparatus according to claim 1, wherein the tubular reactors are jacketed tubular reactors comprising a static mixer.

7. The apparatus according to claim 1, wherein the cooler is at least one selected from the group consisting of a multitubular cooler, a double tube heat exchanger, a coiled cooler, and a plate cooler.

8. The apparatus according to claim 1, wherein the complete mixing type reactor is a tank reactor comprising a supply port, an output port and a stirring instrument.

9. The apparatus according to claim 1, wherein the volatile removing instrument is a screw devolatilizing extruder.

10. The apparatus according to claim 9,
wherein the screw devolatilizing extruder comprises a cylinder comprising a reaction solution supply port, a polymer outlet, and a volatile vent, and
a screw is disposed in the cylinder.

11. The method according to claim 4, wherein the adding the polymerization initiator to the reaction solution comprises adding the polymerization initiator to the reaction solution with a static mixer.

12. The method according to claim 4, wherein the methacrylic monomer mixture comprises an alkyl acrylate or an alkyl methacrylate.

13. The method according to claim 12, wherein the alkyl acrylate comprises an alkyl group comprising 1 to 18 carbon atoms.

14. The method according to claim 13, wherein the alkyl group is selected from the group consisting of methyl, ethyl, n-propyl, n-butyl, dodecyl, and stearyl.

15. The method according to claim 12, wherein the alkyl methacrylate comprises an alkyl group comprising 2 to 18 carbon atoms.

16. The method according to claim 15, wherein the alkyl group is selected from the group consisting of ethyl, n-propyl, n-butyl, 2-ethylhexyl, dodecyl, and stearyl.

17. The method according to claim 4, wherein the polymerization initiator is at least one selected from the group consisting of an organic peroxide, an azo compound, a persulfate, and a redox polymerization initiator.

18. The method according to claim 17, wherein the polymerization initiator is an organic peroxide,
wherein the organic peroxide is at least one selected from the group consisting of tert-butyl peroxy-3,5,5-trimethyl hexanate, tert-butyl peroxylaurate, tert-butyl peroxyisopropyl monocarbonate, tert-hexyl peroxyisopropyl monocarbonate, tert-butyl peroxyacetate, 1,1-bis(tedbutylperoxy)3,3,5-trimethylcyclohexane, 1,1-bis(tedbutylperoxy)cyclohexane, ted-butyl peroxy-2-ethyl hexanate, tert-butyl peroxyisobutyrate, tert-hexyl-hexylperoxy-2-ethyl hexanate, di-ted-butyl peroxide, and 2,5-dimethyl-2,5-bis(tert-butylperoxy)hexane.

19. The method according to claim 17, wherein the polymerization initiator is an azo compound,
wherein the azo compound is at least one selected from the group consisting of 2-(carbamoylazo)-isobutyronitrile, 1,1'-azobis(1-cyclohexanecarbonitrile), 2,2'-azobisisobutyronitrile, 2,2'-azobis(2-methylbutyronitrile), dimethyl 2,2'-azabisisobutyrate, 2,2'-azobis(2,4,4-trimethylpentane), and 2,2'-azobis(2-methylpropane).

20. A method for producing a methacrylic polymer with the apparatus according to claim 1, wherein a concentration of a polymerization initiator in a reaction solution in the cooler is from 0.01 ppm to 5 ppm.

* * * * *